Nov. 3, 1953        P. H. J. BROUWER              2,658,157
                    LOW-POWER HUB DYNAMO
Filed June 21, 1951                          3 Sheets-Sheet 1

INVENTOR
PIETER HENDRIK JOHANNES BROUWER
BY
          *Thea M Vogel*
                         AGENT

INVENTOR

PIETER HENDRIK JOHANNES BROUWER

INVENTOR
PIETER HENDRIK JOHANNES BROUWER

Patented Nov. 3, 1953

2,658,157

UNITED STATES PATENT OFFICE 2,658,157

LOW-POWER HUB DYNAMO

Pieter Hendrik Johannes Brouwer, Eindhoven, Netherlands, assignor to Hartford National Bank and Trust Company, Hartford, Conn., as trustee Application June 21, 1951, Serial No. 232,743

Claims priority, application Netherlands July 4, 1950

8 Claims. (Cl. 310—156)

The invention relates to an electric low-power apparatus, comprising a magnetic circuit, having two relatively rotatable parts one of which is constituted by a multipolar permanent magnet.

The term "electric low-power apparatus" is to be understood to mean electric motors or dynamos the power output of which is approximately 30 watts. The use of the multipolar permanent magnet in such apparatus has the advantage that at a comparatively low speed the frequency of the electric voltage may be comparatively high. This is of paramount importance, for example in connection with hub dynamos for bicycles with a view to obtain the desired constancy of the light radiated directly by the bicycle lamp at very low speeds.

The electric apparatus according to the invention is characterized in that the parts are separated by means (spacers) which adjust the desired length of the air-gap available between the parts and which in addition enable the relative rotation of the parts by rolling friction. One of the essential advantages of such a construction is that when external forces are exerted on one of the parts, for example, by reason of restricted deformation of the parts of the housing to which the circuit is coupled, which deformation is of frequent occurrence in practice, the spacers ensure that the length of the airgap is not reduced at any area below the required length. This advantage is important in connection with the use of electric low-power apparatus, since the construction of such apparatus comprising a permanent magnet is generally such that, in view of the desire of housing a maximum power in a minimum space, which implies inter alia the use of a minimum volume of magnet steel, the length of the airgap is very small, for example of the order of a few tenths of millimeter. Hence there is a possibility that as a result of a variation of the airgap due to the aforesaid deformations, the rotating parts may touch one another disturbing the operation of the apparatus. In addition, it should be borne in mind that with such small apparatus and with a view to obtaining a minimum weight, the materials used for the housing and its thickness are frequently such that during operation the deformations concerned with have a harmful effect, unless particular precautions are taken. As a rule, this consideration does not apply to high-power apparatus, since there is generally no objection to providing them with such rigid and heavy construction that the deformations concerned do not affect them. A further advantage of the construction according to the invention results from the fact that the spacers enable a rolling friction between the relatively rotating parts, which may be ensured, for example, by the use of a ball bearing or a roller bearing, since such spacers are distinguished by the feature of resisting, within the limits determined by the restricted distortions referred to, the resultant variations in force, without increasing the frictional resistance between the moving parts to such an extent that the relative motion of the parts is affected. However, according to a further feature of the invention it is possible to minimize the value of the said variations in force. According to the invention, for this purpose in an electric apparatus of the aforesaid kind, in which the parts are arranged concentrically, apart from the spacers provision is made of means, for example, resilient means, which ensure that at least one of the parts is arranged with a predetermined, comparatively restricted freedom of motion relative to the part of the apparatus coupled therewith. The use of these means ensures that the forces exerted on the circuit by distortions as referred to are sustained as a whole by the distorted part of the apparatus, for example when using a universal joint, or, to a small extent by the means, for example when using a resilient coupling. In both cases the freedom of motion of the particular part of the circuit ensures that in practice the variations in force due to the distortion are not transferred to any serious extent to the spacers between the two parts of the circuit.

The use of a particular, comparatively limited freedom of motion is especially important for bicycle hub dynamos, since distortions of the hub as referred to are generally due to external forces exerted on the wheel, for example, by shaking or jolting of the wheel on account of an uneven road surface or due to a force couple being exerted on the wheel when the bicycle stands crooked in a so-called bicycle rack, which may result in a permanent distortion of the hub. In addition, such a force couple is frequently set up on the bicycle being mounted. The detrimental effect of hub distortions due thereto may be very troublesome, since the lever arm of the couple is comparatively great, that is to say of the order of the wheel radius. However, the distortion per se is such that its detrimental effect can be reduced by a comparatively restricted freedom of motion. This restricted freedom of motion is consequently sufficient to ensure that in any case due to the distortion of the hub, the spacers between the two parts of the magnetic circuit are subjected to additional stress to a less extent than in the absence of the said freedom of motion. As a matter of course, the same advantage arises when, owing to bearing clearance relative to its shaft, the wheel while rotating also performs a swinging movement. In this case distortion of the hub will generally not ensue.

All the aforesaid advantages can also be obtained with an electric apparatus, more particularly a hub dynamo for a bicycle, in which the two parts of the magnetic circuit are arranged side by side in the axial direction. However, when determining the required freedom of motion, it is possible to allow also for the following condition. With this type of apparatus the magnetic force of attraction between the two parts of the magnetic circuit under normal operating conditions suffices to cause the two parts to engage the spacers, so that the required length of the airgap is automatically obtained. However, under conditions differing from the normal operating conditions there is the possibility that the airgap may be increased, although the magnetic force of attraction will tend to prevent such increase. In order that constancy of length of the airgap may be maintained in such cases, it is essential that at least one of the parts should have a freedom of motion as referred to hereinbefore. According to the invention, for this purpose apart from spacers, use is made of means, preferably resilient means, which ensure that at least one of the parts is arranged with a predetermined, relatively restricted freedom of motion with respect to the part of the apparatus coupled therewith, this freedom allowing the magnetic force of attraction between the two parts substantially to avoid an increase in length of the airgap under conditions differing from the normal operating conditions.

According to a further embodiment of the invention of the type of apparatus, in which the two parts of the magnetic circuit are arranged side by side in the axial direction, provision is made not only of spacers but also of resilient means with the result that at least one of the parts is arranged with a predetermined, comparatively restricted freedom of movement with respect to the part of the apparatus coupled therewith, the means being such that, together with the magnetic force of attraction between the two parts, they prevent any increase in length of the airgap, even under conditions differing from the normal operating conditions. It is advisable to use such an embodiment, if the magnetic force of attraction is not great enough to be capable of itself to prevent an increase in airgap.

Since, in the case of job dynamos the probability of the hub being distorted as described above is very great, a hub dynamo according to the invention, in which one of the parts of the magnetic circuit is constituted by a permanent magnet following the rotation of the hub, has the permanent magnet supported in the hub from the means ensuring the restricted freedom of motion. A very simple and efficacious embodiment is obtained, if use is made of resilient means which are constituted merely by one or more rubber washers inserted between the cylindrical inner surface of the hub and a cylindrical surface of one of the parts.

In order to ensure a compact construction in a radial direction of the type of apparatus, in which the two parts of the magnetic circuit are arranged side by side in the axial direction, use is preferably made of an annular permanent magnet and the running surfaces for the rolling parts of the spacers have a diameter which is smaller than the internal diameter of the ring and form part of members which are connected to the permanent magnet or to the other part of the magnetic circuit.

From the manufacturing angle it has been found advantageous to constitute the member connected to the magnet by a piece of magnet steel made in one piece with the magnet. If in this case the running surface for the spacers is required to be located in the same plane as the surfaces of the magnet poles facing the airgap, this can be ensured in a very simple manner by a grinding operation.

In order that the invention may be more clearly understood and readily carried into effect, it will now be described more fully with reference to the accompanying drawing, in which several forms of a hub dynamo embodying the invention are shown diagrammatically.

Figure 1:
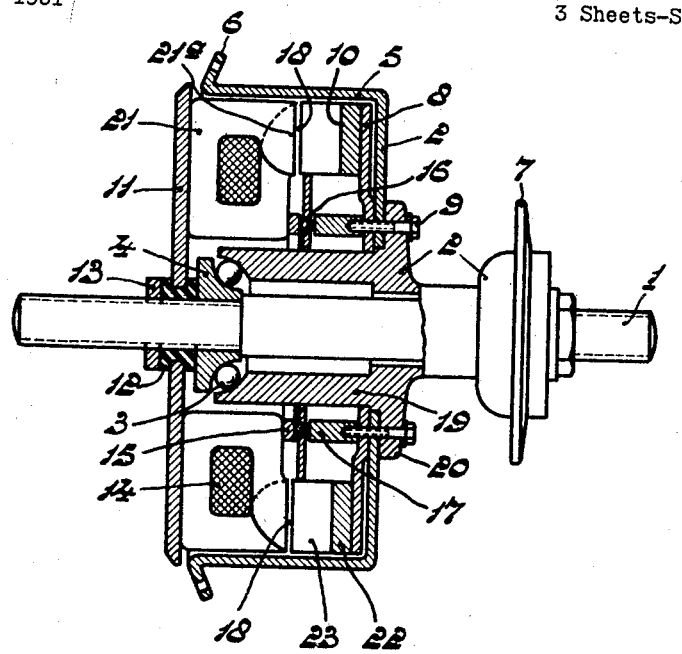
Fig. 1 is a sectional view of a hub dynamo, in which the two parts of the magnetic circuit are arranged side by side in the axial direction and in which a non-rotating part of the generator circuit is arranged on resilient supports.

Referring to the figures, in which corresponding component parts are designated by like reference numerals, the hub 2 is journalled by means on the shaft form of two ball bearings 3 and two adjustable cones 4. Only one ball bearing and one cone are shown in the figures, the second specimens being located in the usual manner on the other side of the shaft 1. The hub 2 comprises a part 19, provided with a flange 20, to which is secured a part 5 of greater diameter than the hub 2 and in which the parts of the dynamo are housed. The parts 5 and 19 of the hub are provided with flanges 6 and 7 respectively, for the attachment of spokes of the wheel (not shown).

Referring to Fig. 1 the two parts of the magnetic circuit are constituted by a multipolar permanent magnet 10 and a sheet-iron packet 21, which are separated by an airgap 18. The permanent magnet 10 comprises an annular plate 22 and pole pieces 23, which project in the axial direction and are spaced apart by equal distances in the annular direction. The plate 22 and the pole pieces 23 are made in one piece of magnet steel. The permanent magnet 10 is secured to the hub 2 by means of a plate 8. The sheet-iron packet 21, which is built up from radial sheets, is secured to a plate 11, which is held on the shaft 1 by means of an annular rubber member 12. The rubber body 12 is clamped in position between the cone 4 and a nut 13 on the shaft 1, so that the sheet-iron packet 21 has a predetermined restricted freedom of motion with respect to the shaft 1. Each iron sheet has primarily the shape of a non-continuous ring, the ends 21a of which are spaced apart by insulating material so as to lie side by side in the annular direction facing the pole pieces 23 of the permanent magnet. The torodial apertures of the sheet-iron packet accommodate a coil 14 in which the generator voltage is produced. The magnet 10 and the shet-iron packet 21 are separated by spacers shaped in the form of a ball bearing 16, provided with two ball races 15 and 17, of which one (15) is secured to the sheet-iron packet and the other (17) to the permanent magnet. By reason of the ball bearing 16, the length of the airgap 18 is adjusted, that is to say, this ball bearing prevents the airgap length from decreasing below the required length due to the magnetic force of attraction between the magnet and the sheet-iron packet. Furthermore the ball bearing enables rotation of the magnet 10 relatively to the sheet-iron packet 21 by rolling friction. As a matter of course the ball bearing 16 may be replaced by a roller bearing.

If during operation of the hub dynamo the hub 2 is subject to distortion, or if the position of the hub 2 relative to the shaft 1 has changed, which, of course, is understood not to include the relative rotation of the shaft 1 and the hub 2, a displacement of the permanent magnet 10 which tends to increase the length of the airgap 18, will be followed by a displacement of the sheet-iron packet 21 owing to the magnetic attraction, this packet being enabled to do so by the comparatively restricted freedom of movement by reason of the resilience of the rubber body 12. Thus even under the conditions differing from the normal operating conditions, the restricted freedom of motion of the sheet-iron packet 21 permits the magnetic attraction between the two parts to prevent substantially any increase in length of the airgap.

In the case of a change in position of the magnet 10, as referred to above, which change tends to reduce the length of the airgap, the magnet 10 will exert a pressure, via the spacers 17, 16 and 15, on the sheet-iron packet 21, so that due to the rubber body 12 the sheet-iron packet is capable of adjustment relative to the magnet, whilst at the same time maintaining the length of the airgap. Neither will any combination of the aforesaid displacements of the permanent magnet 10 affect the length of the airgap. In general, the magnetic attraction will suffice to prevent any increase in length of the airgap 18 with airgap lengths of several tenths of a millimeter. If necessary, the attraction may be increased or decreased by giving the rubber bush a bias stress in a desired direction.

Apart from the length of the airgap remaining unvaried during the said distortions, the advantage is obtained that, since the hub part 5 is enabled by the rubber body 12 to be distorted, thus the forces produced are primarily absorbed by the hub and, to a small extent, by the rubber body. The balls 16 are thus subject to materially less stress than in the case of a rigid connection of the plate 11 to the shaft 1.

Figure 2:
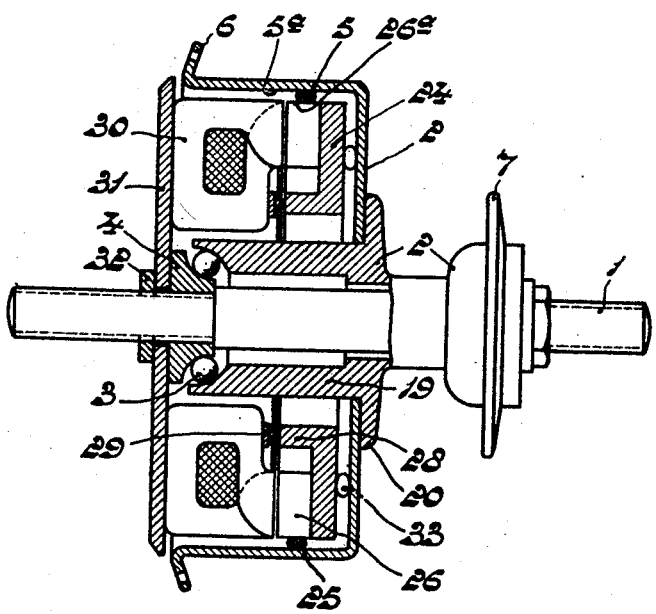
Fig. 2 is a sectional view of a hub dynamo in which the parts of the magnetic circuit are arranged as in Fig. 1, a rotary part being arranged resiliently.
Figure 4:
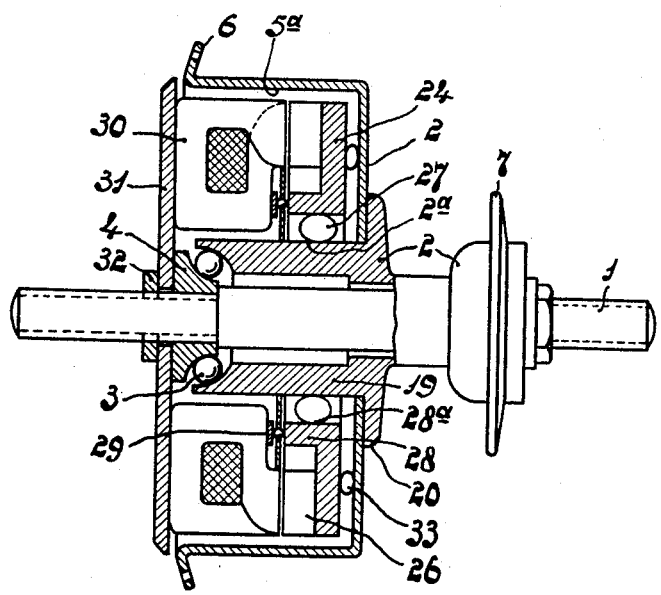
Fig. 4 is a modification of the view shown in Fig. 2.

In the embodiment shown in Fig. 2 the permanent magnet 24 is supported in the hub 2 by means of a rubber washer 25, arranged between the cylindrical inner surface 5a of the hub part 5 and the cylindrical outer surface 26a of the pole pieces 26. As an alternative, the magnet 24 may be supported by the hub by means of a resilient ring 27, as shown in Figure 4, arranged between a cylindrical inner surface 2a of the hub 2 and the cylindrical inner surface 28a of an annular member 28, which is made of magnet steel and is made integral with the magnet body 24. This member 28, shown in both Figures 2 and 4, and the annular member 29 secured to the sheet-iron packet 30 constitute together the ball races of the ball bearing. The sheet-iron packet 30 is seated on the shaft 1 by means of a plate 31, which is clamped between the cone 4 and a nut 32. A variation in position of the hub 2 relative to the shaft 1 or of distortion of the hub, will not cause the magnet 24 to follow this variation in position, by reason of the magnetic attraction between the magnet and the sheet-iron packet and owing to resilient means 25 or 27, whereas the rotation of the hub 2 relative to the shaft 1 is followed by the magnet 24. Even in this case the resilient means 25 or 27 are such that they permit the magnetic force substantially to prevent any increase in length of the airgap. If necessary, the magnetic force may be increased by means of a resilient ring 33. In this case the resilient means (25 or 27 and 33) are such that together with the magnetic attraction they substantially prevent any increase in length of the airgap. This purpose may be served by the ring 33 alone.

If desired, the rubber washers 25, 27 and 33 may be replaced by laminated or helical springs.

Similar to the embodiment shown in Fig. 1, the constructions shown in Figs. 2 and 4 have the advantage that in the case of distortion or variation in position of the hub and balls of the spacers are, in general, subject to materially more favourable stress than in the case of a rigid connection of the magnet to the hub.

It may furthermore be seen from Figs. 1, 2, and 4 that the running surfaces for the balls of the bearing have a diameter which is smaller than the internal diameter of the pole pieces 23 and 26 respectively, so that in a radial direction a compact construction is obtained.

Figure 3:
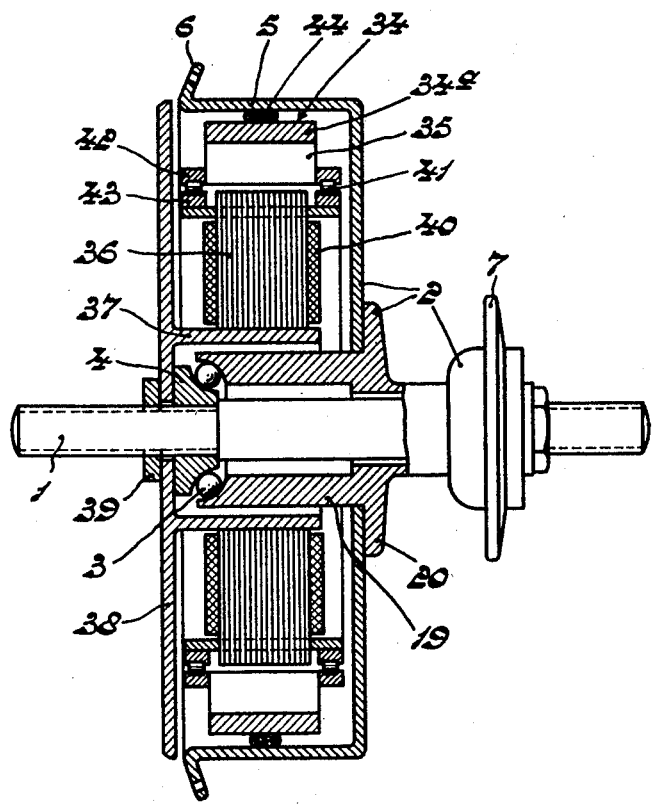
Fig. 3 is a sectional view of a hub dynamo, in which the two parts of the magnetic circuit are arranged concentrically and in which a rotary part is supported resiliently.

In the embodiment shown in Fig. 3 the permanent magnet 34 comprises a cylinder 34a and pole pieces 35, which extend in the radial direction and are spaced apart in the annular direction by equal distances. The sheet-iron packets 36 are also arranged so as to protrude in the radial direction and so as to be annularly spaced apart by equal distances on a sleeve 37 of magnetic material, which is integral with a plate 38, which is secured to the shaft 1 by means of a cone 4 and a nut 39. Each sheet-iron packet is surrounded by a coil 40. The spacers are constituted by a roller bearing comprising rollers 41 and ball races, of which one (42) is secured to the magnet 34 and the other (43) to the sheet-iron packets 36. It is thus ensured that in spite of distortions occurring the length of the airgap is not reduced at any area below the required value. The magnet 34 is supported in the hub by means of a resilient washer 44, so that the magnet has a restricted freedom of motion relative to the hub.

In this embodiment the rollers of the spacers are thus also subject to materially more favourable stress than in the case of a rigid connection of the magnet to the hub.

Self-evidently it is possible to interchange the positions of the permanent magnet and the sheet-iron packets in the embodiments shown diagrammatically. In this case the sheet-iron packets will be required to be provided with sliding contacts. If desired, the two parts may rotate in opposite directions.

What I claim is:

1. A low-power hub dynamo comprising a magnetic circuit having a shaft, a housing loosely mounted thereon, first and second relatively rotatable means mounted on said shaft and housing respectively, one of said means comprising a multipolar permanent magnet, and rolling spacer means supported by said first and second means for preventing an airgap separating said first and second means from being made shorter than a certain predetermined minimum length, said rolling spacer means permitting the aforesaid relative rotation by rolling friction.

2. A low-power hub dynamo comprising a magnetic circuit having a shaft, a hub loosely mounted thereon, first and second relatively rotatable means mounted on said shaft and hub respectively, one of said means comprising a multipolar permanent magnet, resilient means for mounting one of said means with a predetermined, comparatively restricted freedom of motion, and rolling spacer means supported by said first and second means for preventing an airgap separating said first and second means from being made shorter than a certain predetermined minimum length, said rolling spacer means permitting the aforesaid relative rotation by rolling friction.

3. A low-power hub dynamo comprising a magnetic circuit having a shaft, a hub loosely mounted thereon, first and second relatively rotatable means concentrically arranged with respect to each other and mounted on said shaft and hub respectively, one of said means comprising a multipolar permanent magnet, resilient means for mounting one of said means with a predetermined, comparatively restricted freedom of motion, and rolling spacer means supported by said first and second means for preventing an airgap separating said first and second means from being made shorter than a certain predetermined minimum length, said rolling spacer means permitting the aforesaid relative rotation by rolling friction.

4. A low-power hub dynamo comprising a magnetic circuit having a shaft, a hub loosely mounted thereon, first and second relatively rotatable means arranged side by side in the axial direction and mounted on said shaft and said hub respectively, one of said means comprising a multipolar permanent magnet producing a magnetic force of attraction between the two means, resilient means for mounting one of said rotatable means with a predetermined, comparatively restricted freedom of motion, and rolling spacer means supported by said first and second means for preventing an airgap separating said first and second means from being made shorter than a certain predetermined minimum length, said rolling spacer means permitting the aforesaid relative rotation by rolling friction.

5. A low-power hub dynamo comprising a magnetic circuit having a shaft, a hub loosely mounted thereon, first and second relatively rotatable means arranged side by side in the axial direction, end plates mounted on said shaft and hub respectively for supporting said rotatable means, one of said means comprising a multipolar permanent magnet producing a magnetic force of attraction between the two rotatable means, first resilient means for mounting one of said means with a predetermined, comparatively restricted freedom of motion, second resilient means mounted between one of said end plates and the rotatable means adjacent thereto, for urging said rotatable means in an axial direction toward said other means, and rolling spacer means supported by said first and second means for preventing an airgap separating said first and second means from being made shorter than a certain predetermined minimum length, said rolling spacer means permitting the aforesaid relative rotation by rolling friction.

6. A low-power hub dynamo comprising a magnetic circuit having a shaft, a hub loosely mounted thereon and relatively rotatable therewith, first rotatable means mounted on said shaft, second rotatable means comprising a permanent magnet mounted on said hub, resilient means for mounting said magnet on said hub with a predetermined, comparatively restricted freedom of motion, and rolling spacer means supported by said first and second means for preventing an airgap separating said first and second means from being made shorter than a certain predetermined minimum length, said rolling spacer means permitting the aforesaid relative rotation by rolling friction.

7. A low-power hub dynamo comprising a magnetic circuit having a shaft, a hub loosely mounted thereon and relatively rotatable therewith, first rotatable means mounted on said shaft, second rotatable means comprising a permanent magnet mounted on said hub, resilient means comprising a rubber washer between said hub and said magnet for mounting said magnet on said hub with a predetermined, comparatively restricted freedom of motion, and rolling spacer means supported by said first and second means for preventing an airgap separating said first and second means from being made shorter than a certain predetermined minimum length, said rolling spacer means permitting the aforesaid relative rotation by rolling friction.

8. A low-power hub dynamo comprising a magnetic circuit having a shaft, a hub loosely mounted thereon, first and second relatively rotatable means arranged side by side in the axial direction and mounted on said shaft and said hub respectively, one of said means comprising a multipolar permanent magnet producing a magnetic force of attraction between the two means, resilient means for mounting one of said rotatable means with a predetermined, comparatively restricted freedom of motion, and ball-bearing spacer means carried in annular running surfaces mounted on said first and second means for preventing an airgap separating said first and second means from being made shorter than a certain predetermined minimum length, said ball-bearing spacer means permitting the aforesaid relative rotation by rolling friction, said running surfaces having a diameter which is smaller than the internal diameter of the magnet, one of said running surfaces being of magnet steel integral with said magnet.

PIETER HENDRIK JOHANNES BROUWER.

References Cited in the file of this patent

UNITED STATES PATENTS

| Number | Name | Date |
|---|---|---|
| 459,024 | Short | Sept. 8, 1891 |
| 515,216 | Gutmann | Feb. 20, 1894 |
| 1,688,891 | Spreen | Oct. 23, 1928 |